United States Patent [19]

Mitsuyama

[11] Patent Number: 5,065,197
[45] Date of Patent: Nov. 12, 1991

[54] ELECTROPHOTOGRAPHIC PRINTER HAVING COMPACT GEOMETRIC PROJECTION REGIONS

[75] Inventor: Akira Mitsuyama, Nara, Japan
[73] Assignee: Sharp Kabushiki Kaisha, Osaka, Japan
[21] Appl. No.: 341,759
[22] Filed: Apr. 21, 1989
[30] Foreign Application Priority Data May 11, 1988 [JP] Japan .................. 63-115716

[51] Int. Cl.$^5$ ............................. G03G 15/00
[52] U.S. Cl. ............................ 355/309; 358/300
[58] Field of Search ............. 355/211, 228, 309, 321, 355/200; 346/160, 160.1; 271/3; 358/300

[56] References Cited

U.S. PATENT DOCUMENTS 4,681,425 7/1987 Tanimoto ............... 355/309
4,847,644 7/1989 Oda et al. ............... 346/160

FOREIGN PATENT DOCUMENTS 3800238 7/1988 Fed. Rep. of Germany .
62-971 1/1987 Japan .................. 355/228
62-262059 11/1987 Japan .................. 355/272
63-236052 9/1988 Japan .

Primary Examiner—Joan H. Pendegrass
Attorney, Agent, or Firm—Stevens, Davis, Miller & Mosher

[57] ABSTRACT

An electrophotographic printer including a paper storage portion for storing paper sheets to be printed, a paper discharge portion for receiving the paper sheets which have been discharged to the paper discharge portion upon completion of printing of the paper sheets and a printing portion provided with a photosensitive member, a corona charger, an exposure device, a developing device, a transfer charger, a cleaning device and a fixing device, in which when the paper storage portion, the paper discharge portion and the printing portion are projected over a plane for installing the electrophotographic printer, first, second and third projected regions are, respectively, occupied by the paper storage portion, the paper discharge portion and the printing portion such that at least one of the first, second and third projected regions is contained in at least either one of the remaining two of the first, second and third projected regions.

8 Claims, 3 Drawing Sheets

5,065,197

ELECTROPHOTOGRAPHIC PRINTER HAVING COMPACT GEOMETRIC PROJECTION REGIONS

BACKGROUND OF THE INVENTION

The present invention relates to a printer for forming an image on a paper sheet, for example, a laser printer, an LED (light emitting diode) printer, etc.

In response to recent popularization of business machines such as computers, the number of the business machines in use is increasing. Upon such increase of the number of the business machines in use, it becomes difficult to secure space for additionally installing new business machines. For example, computers and the peripheral devices are usually set on desks in offices. Since the computers and the peripheral devices occupy a large space, other works on the desks or in the vicinity of the desks cannot be performed efficiently. Thus, these business machines are necessarily required to be made compact in size.

Printers are frequently used as peripheral devices of computers and word processors which are in popular use as business machines. The printers include a laser printer or an LED printer of electrostatic copying type.

However, in the laser printer or the LED printer referred to above, since accessories such as a paper feeding tray, a copy receiving tray, etc. are provided on the printer such that end portions of the accessories protrude out of the printers, space for installing the printers as a whole becomes large, thereby preventing the printers from being made compact in size.

SUMMARY OF THE INVENTION

Accordingly, an essential object of the present invention is to provide, with a view to eliminating the above described problems of the prior art printers, an electrophotographic printer which is compact in size.

In order to accomplish this object of the present invention, an electrophotographic printer embodying the present invention includes a paper storage portion for storing paper sheets to be printed, a paper discharge portion for receiving the paper sheets which have been discharged to said paper discharge portion upon completion of printing of the paper sheets and a printing portion provided with a photosensitive member, a corona charger, an exposure device, a developing device, a transfer charger, a cleaning device and a fixing device, the improvement comprising: first, second and third projected regions, when said paper storage portion, said paper discharge portion and said printing portion are projected over a plane on which said electrophotographic printer is installed, being, respectively, occupied by said paper storage portion, said paper discharge portion and said printing portion such that at least one of the first, second and third projected regions is contained in at least either one of the remaining two of the first, second and third projected regions.

By the above described arrangement of the present invention, since at least one of the first, second and third projected regions of the paper storage portion, the paper discharge portion and the printing portion which occupy large projected regions among constituent portions of the electrophotographic printer is contained in at least either one of the remaining two of the first, second and third projected regions, a sum of the first, second and third regions is reduced.

BRIEF DESCRIPTION OF THE DRAWINGS

This object and features of the present invention will become apparent from the following description taken in conjunction with the preferred embodiments thereof with reference to the accompanying drawings, in which.

DETAILED DESCRIPTION OF THE INVENTION

Figure 1A:
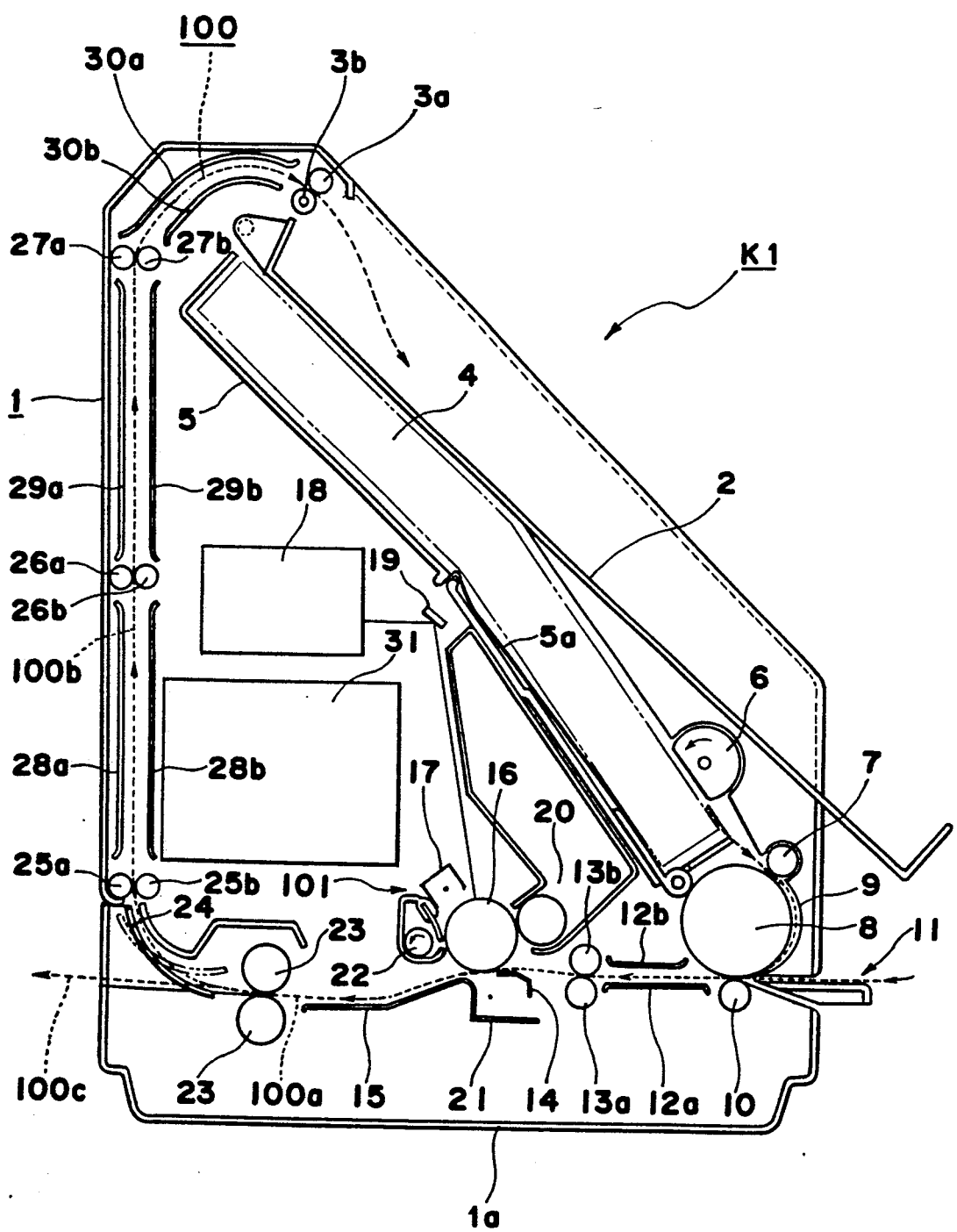
FIG. 1A is a schematic side sectional view of a laser printer according to a first embodiment of the present invention.

Referring now to the drawings, there is shown in FIG. 1A, a laser printer K1 according to a first embodiment of the present invention. The laser printer K1 includes a frame 1. The frame 1 has a cross section of a substantially pentagonal shape obtained by removing a triangular portion from a right upper corner of a quadrilateral so as to have an oblique portion. Below the oblique portion, a face-down tray 2 for storing printed paper sheets is provided. The face-down tray 2 is pivotally supported at its upper end portion. A pair of discharge rollers 3a and 3b are provided, in the vicinity of an upper end portion of the face-down tray 2, on a side wall of the frame 1 so as to carry the printed paper sheet to a predetermined position in the face-down tray 2 by a transport force of the discharge rollers 3a and 3b and through gravity. Immediately below the face-down tray 2, a paper feeding tray 5 for storing paper sheets 4 to be fed is provided.

The paper feeding tray 5 is disposed at an angle of inclination substantially identical with that of the face-down tray 2. A paper feeding roller 6 is provided at a lower portion of the paper feeding tray 5 so as to confront the paper sheets 4. At the lower portion of the paper feeding tray 5, a rotary plate 5a for pushing the paper sheets 4 upwardly towards the paper feeding roller 6 is provided on a bottom face of the paper feeding tray 5.

Downstream of the paper feeding tray 5 in a direction of transport of the paper sheet 4, a transport roller 7 and a deflection transport roller 8 are provided so as to not only deliver into a paper transport passage 100 (shown by the dotted lines) the paper sheet 4 fed by the paper feeding roller 6 but also change direction of travel of the paper sheet 4 in operative association with a transport guide 9. Below the deflection transport roller 8, a transport roller 10 is provided in contact with the deflection transport roller 8. The paper sheet 4 whose direction of travel has been changed is conveyed via a horizontal transport passage 100a extending substantially in parallel with a bottom portion 1a of the frame 1. Meanwhile, the deflection transport roller 8 and the transport roller 10 also function to carry into the transport passage 100a a paper sheet inserted from a manual paper feeding portion 11. In the transport passage 100a, transport guides 12a, 12b and 14 and transport rollers 13a and 13b are provided so as to further carry to a visible image transfer portion the paper sheet conveyed by the deflection transport roller 8 and the transport roller 10 and a transport guide 15 for delivering the paper sheet from the transfer portion to a fixing portion as will be described below.

Above or along the transport passage 100a, an electrophotographic processing portion 101 and a pair of heat fixing rollers 23 are sequentially provided. A printing portion is constituted by the electrophotographic processing portion 101 and the heat fixing rollers 23. The electrophotographic processing portion 101 is constituted by a photosensitive member 16 and various devices provided around the photosensitive member 16. The various devices include a corona charger 17 for electrically charging the photosensitive member 16 to a predetermined voltage, a laser beam emitter 18 for forming an electrostatic latent image on the photosensitive member 16 through a reflection mirror 19, a developing device 20 for developing the electrostatic latent image into a visible image by using toner, a transfer charger 21 for transferring the visible toner image on the photosensitive member 16 to the paper sheet and a cleaning device 22 for removing, after the transfer process, toner adhering to the photosensitive member 16. Meanwhile, at the heat fixing rollers 23, the toner image transferred onto the paper sheet is subjected to heat fixing under a proper pressure.

Downstream of the heat fixing rollers 23 in the direction of travel of the paper sheet, a transport guide 24 is provided so as to be changed over to the position shown by the solid lines and the position shown by the one-dot chain lines such that the paper sheet can be selectively conveyed by the transport guide 24 to a vertical transport passage 100b extending in parallel with a left side wall of the frame 1 and a branch transport passage 100c. In contrast with the paper sheet discharged to the face-down tray 2 in which the printed face of the paper sheet is oriented downwardly, the paper sheet carried to the branch transport passage 100c is discharged in a face-up state, i.e. in a state where the printed face of the paper sheet is oriented upwardly. In the transport passage 100b, pairs of transport rollers 25a and 25b, 26a and 26b, and 27a and 27b and transport guides 28a and 28b, and 29a and 29b are provided. Furthermore, downstream of the transport passage 100b, a pair of transport guides 30a and 30b for deflecting the direction of travel of the paper sheet towards the face-down tray 2 are provided. Downstream of the transport guides 30a and 30b, the paper discharge rollers 3a and 3b mentioned earlier are provided so as to discharge the paper sheet into the face-down tray 2.

Figure 1B:
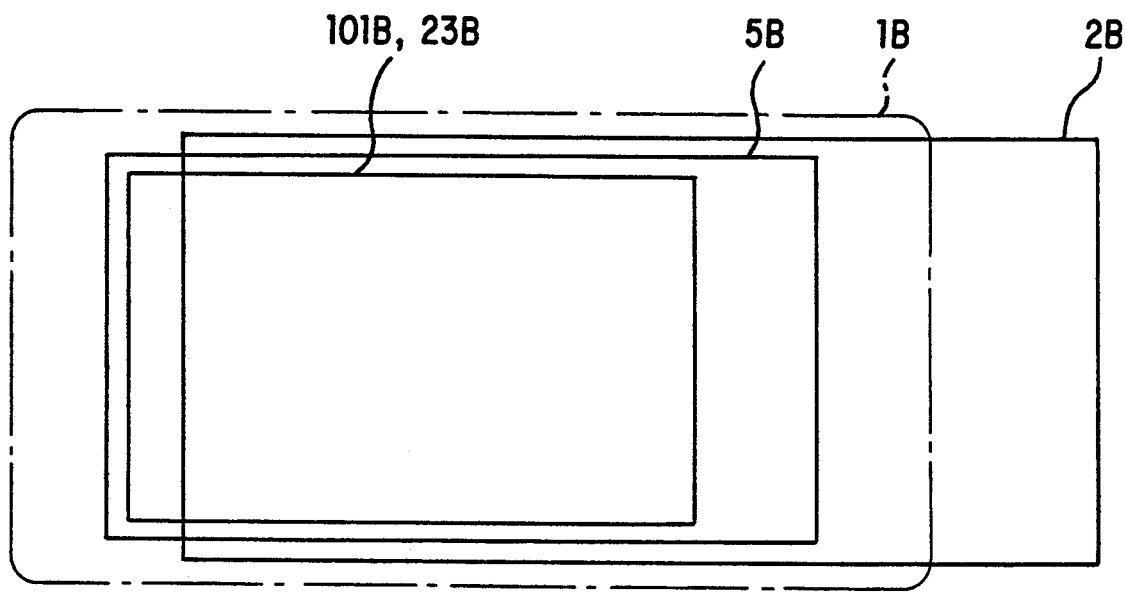
FIG. 1B illustrates geometric projection regions of the laser printer of FIG. 1.

As will be seen from the foregoing, the paper feeding tray 5 is so provided as to be contained in a region located substantially below the face-down tray 2 and the printing portion constituted by the electrophotographic processing portion 101 and the heat fixing rollers 23 is so provided as to be contained in a region located below the paper feeding tray 5. Namely, since the paper feeding tray is contained in the region located below the face-down tray 2, a region for installing the paper feeding tray 5 is contained in a region for installing the face-down tray 2. In other words, a region of the paper feeding tray 5 projected over the bottom portion 1a of the frame 1 is contained in a region of the face-down gray 2 projected over the bottom portion 1a. Likewise, since the printing portion is contained in the region located below the paper feeding tray 5, a region of the printing portion projected over the bottom portion 1a is contained in a region of the paper feeding tray 5 projected over the bottom portion 1a. Meanwhile, the printing portion is disposed in a substantially closed region inside the paper transport passage 100 extending from the paper feeding tray 5 to the face-down tray 2. FIG. 1B shows various geometric projection regions of the printer portions onto a plane which is parallel to the planar support surface of the frame supporting the various printer portions. FIG. 1B shows a projected region 5B of the paper storage portion 5, a projected region 2B of the paper discharge portion 2 and a projected region 101B, 23B of the printing portion 101, 23. FIG. 1B illustrates an embodiment in which projection region 101B, 23B of printing portion 101, 23 is contained in the projected region 5B of paper storage portion 5. Also, in FIG. 1B, reference number 1B denotes a projected region of frame 1.

As shown in FIG. 1A and 1B, a projected region of a paper storage portion 5 is substantially contained within a projected region of paper discharge portion 2.

In the electrophotographic printer, large regions are by the paper feeding tray (cassette) 5, the paper discharge tray including the face-down tray 2, etc. and the printing portion. In order to make the electrophotographic printer compact in size, it is imperative to minimize a sum of these regions. In this respect, the above described arrangement of the present invention achieves such a goal. It is to be noted that relation of containment among the projected regions is not restricted to the arrangement of FIGS. 1A and 1B.

Hereinbelow, operation of the laser printer K1 of the above described arrangement is described. In response to an operational signal from outside, rotation of the photosensitive member 16 is started and the photosensitive member 16 is electrically charged by the corona charger 17. Then, laser beams are irradiated onto the electrically charged surface of the photosensitive member 16 and the irradiated portion is subjected to charge erasure such that an electrostatic latent image is formed at the charge erased portion. Subsequently, toner is caused to adhere to a portion on the photosensitive member 16 corresponding to the electrostatic latent image by the developing device 20 so as to develop the electrostatic latent image into a visible image.

Meanwhile, a paper sheet is fed to the transport passage 100a from the paper feeding tray 5 by the paper feeding roller 6 or from the manual paper feeding portion 11 by the deflection transport roller 8 and the transport roller 10. Then, the paper sheet is delivered to the photosensitive member 16 by the transport rollers 13a and 13b via the transport guides 12a, 12b and 14.

The visible image formed on the photosensitive member 16 is transferred onto the paper sheet by the transfer charger 21. Transport of the paper sheet is controlled such that the visible image on the photosensitive member 16 is transferred onto a predetermined portion of the paper sheet. Residual toner on the photosensitive member 16 after the transfer process is removed by the cleaning device 22. The visible image transferred onto the paper sheet is advanced to the heat fixing rollers 23 through the transport guide 15 so as to be semipermanent, fixed on the paper sheet. After completion of printing, it is decided based on position of the transport guide 24 set by a command of the operator whether the paper sheet is advanced to the transport passage 100b or the branch transport passage 100c. In the latter case, namely when the paper sheet is advanced to the branch transport passage 100c, the paper sheet is discharged out of the frame 1 such that the printed face of the paper sheet is oriented upwardly. On the other hand, in the former case, namely when the paper sheet is advanced to the transport passage 100b, the paper sheet is discharged into the face-down tray 2 by the transport rollers 25a, 25b, 26a, 26b, 27a and 27b and the discharge rollers 3a and 3b via the transport guides 28a, 28b, 29a, 29b, 30a and 30b in a face-down state, i.e. in a state where the printed face of the discharged paper sheet is oriented downwardly, so that the paper sheet is arranged in a predetermined sequence automatically. Meanwhile, since the paper sheet is conveyed from the upper portion of the face-down tray 2 by a transport force of the discharge rollers 3a and 3b and through gravity, the paper sheet reaches the lower end portion of the face-down tray 2 positively. Thus, even if a plurality of the paper sheets are discharged into the face-down tray 2, the paper sheets are automatically set in position.

In the laser printer K1 of FIG. 1A, since only the paper sheets stored in the paper feeding tray 5 can be automatically fed, the number of different sizes of paper sheets enabling automatic feeding thereof is limited to one. Furthermore, the paper sheets stored in the paper feeding tray 5 is restricted to a predetermined amount.

Figure 2:
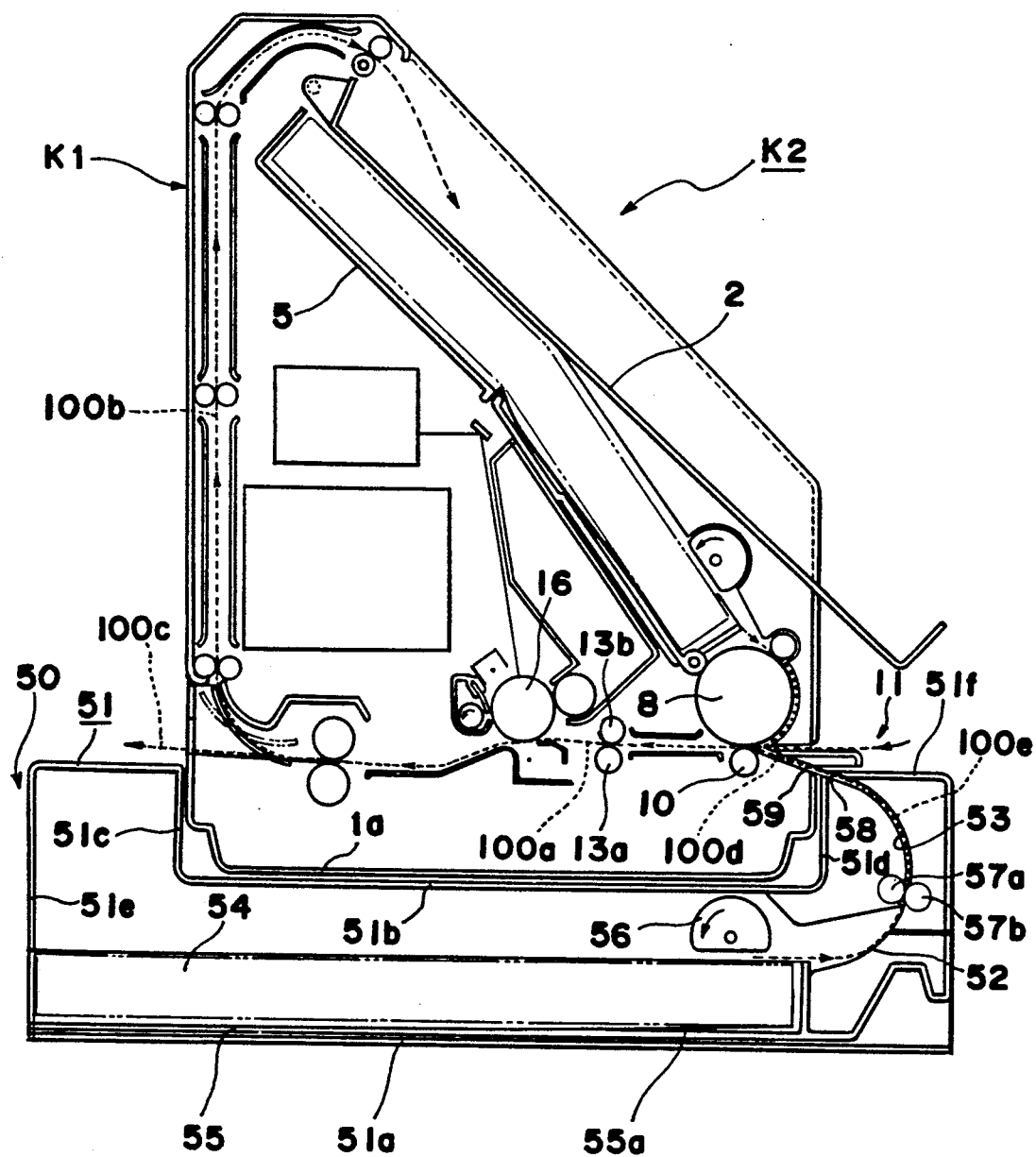
FIG. 2 is a schematic side sectional view of a laser printer provided with an automatic paper feeding tray device, according to a second embodiment of the present invention.

Thus, a laser printer K2 provided with a detachable automatic paper feeding tray device 50 for increasing the number of sizes of usable paper sheets and the number of the usable paper sheets, according to a second embodiment of the present invention is described with reference to FIG. 2. It is to be noted that the laser printer K2 is obtained by mounting the detachable automatic paper feeding tray device 50 on a lower portion of the laser printer K1 of FIG. 1. The automatic paper feeding tray device 50 is formed by a frame 51 having a substantially rectangular cross section. The laser printer K1 is placed in a recess defined, at a central portion of an upper face of the frame 51, by frame portions 51b, 51c and 51d so as to be secured in the recess by a fixing member (not shown). If clamping of this fixing member is cancelled, it becomes possible to remove the laser printer K1 from the automatic paper feeding tray device 50. A paper feeding tray 55 is provided or a bottom portion 51a of the frame 51 such that a left end portion of the paper feeding tray 55 is held in contact with a left side portion 51e of the frame 51.

The paper feeding tray 55 includes a rotary plate 55a for pushing paper sheets 54 upwardly towards a paper feeding roller 56 provided at an upper right end portion of the paper feeding tray 55. A curved paper passage 100e extending from a right end portion of the paper feeding tray 55 is defined by transport guides 52 and 53 and is led to a paper outlet 58 provided at a location at which the frame portion 51d of the frame 51 intersects with a right upper portion 51f of the frame 51.

A pair of transport rollers 57a and 57b for transporting the paper sheet to the paper outlet 58 is provided in the course of the paper passage 100e. The paper feeding roller 56 and the transport rollers 57a and 57b are driven by a motor (not shown). A power source for actuating the motor is provided outside the laser printer K2 and a control signal for actuating the motor, etc. are inputted from the laser printer K1.

Meanwhile, in the laser printer K1, a paper inlet 59 for receiving the paper sheet fed from the paper outlet 58 is provided at a position corresponding to that of the paper outlet 58. A transport passage 100d is provided between the paper inlet 59 and the transport rollers 8 and 10.

Operation of the laser printer K2 of the above mentioned arrangement is described, hereinbelow. In response to input of a printing signal after the operator has selected the automatic paper feeding tray device 50 by depressing a selection switch (not shown), rotation of the photosensitive member 16 is started and a toner image is formed on the photosensitive member 16 through the above described processes. In response to the above described operation, the paper feeding roller 56 is rotated so as to feed the paper sheet 54. The paper sheet 54 is delivered to the transport rollers 8 and 10 by the transport rollers 57a and 57b through the transport passage 100e, the paper outlet 58, the paper inlet 59 and the transport passage 100d. Subsequently, the paper sheet 54 is conveyed, via the transport passage 100a as in the above mentioned case of paper feeding from the paper feeding tray 5 and the manual paper feeding portion 11, by the transport rollers 8 and 10 and further, by the transport rollers 13a and 13b to a location at which the paper sheet 54 is brought into contact with the photosensitive member 16. Thereafter, the transfer and fixing processes are performed in the same manner as in the laser printer K1 and then, is either discharged out of the laser printer K2 in the face-up state through the branch transport passage 100c or is discharged into the face-down tray 2 in the face-down state through the transport passage 100b.

In the laser printer K2, the automatic paper feeding tray device is detachably mounted on the laser printer K1. However, in the case where it is anticipated that a plurality of the paper feeding trays are required to be provided, the automatic feeding tray device can also be provided integrally with the laser printer K1.

As is clear from the foregoing description, in the electrophotographic printer of the present invention, at least one of the projected regions of the paper storage portion, the paper discharge portion and the printing portion which occupy large projected regions among the constituent portions of the electrophotographic printer is contained in at least either one of the remaining two of the three projected regions, so that a sum of the three projected regions is reduced and thus, the electrophotographic laser can be made compact in size.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electrophotographic printer comprising:
   a frame for supporting said printer on a substantially planar surface;
   a paper storage portion for storing paper sheets to be printed;
   a paper discharge portion for receiving the paper sheets which have been discharged to said paper discharge portion upon completion of printing on the paper sheets, said paper storage portion being interposed between said paper discharge portion and said printer portion; and
   a printing portion provided with a photosensitive member, a corona charger, an exposure device, a developing device, a transfer charger, a cleaning device and a fixing device; said paper storage portion, said paper discharge portion and said printing portion being supported on said frame above said planar surface; said paper storage portion and said paper discharge portion being oriented obliquely relative to said planar surface; and said paper storage portion, said paper discharge portion and said printing portion respectively having first, second and third geometric projection regions in a plane parallel to said planar surface, at least one of the first, second and third projection regions being contained in at least one of the remaining two of the first, second and third projected regions.

2. An electrophotographic printer as claimed in claim 1, wherein the first projected region is substantially contained in the second projected region.

3. An electrophotographic printer as claimed in claim 2, wherein the third projected region is contained in the first region.

4. An electrophotographic printer as claimed in claim 3, further including a detachable automatic paper feeding tray device.

5. An electrophotographic printer as claimed in claim 2, further including a detachable automatic paper feeding tray device.

6. An electrophotographic printer as claimed in claim 1, further including a detachable automatic paper feeding tray device.

7. An electrophotographic printer comprising:
a frame for supporting said printer on a substantially planar surface;
a paper storage portion for storing paper sheets to be printed;
a paper discharge portion for receiving the paper sheets which have been discharged to said paper discharge portion upon completion of printing on the paper sheets, said paper storage portion being interposed between said printing portion and said paper discharge portion; and
a printing portion provided with a photosensitive member, a corona charger, an exposure device, a developing device, a transfer charger, a cleaning device and a fixing device; said paper storage portion, said paper discharge portion and said printing portion being supported on said frame above said planar surface; and said paper storage portion, said paper discharge portion and said printing portion respectively having first, second and third geometric projection regions in a plane parallel to said planar surface, at least one of the first, second and third projection regions being contained in at least one of the remaining two of the first, second and third projected regions.

8. An electrophotographic printer comprising:
a frame for supporting said printer on a substantially planar surface;
a paper storage portion for storing paper sheets to be printed;
a paper discharge portion for receiving the paper sheets which have been discharged to said paper discharge portion upon completion of printing on the paper sheets, said paper storage portion being interposed between said paper discharge portion and said printer portion; and
a printing portion provided with a photosensitive member, a corona charger, an exposure device, a developing device, a transfer charger, a cleaning device and a fixing device; said paper storage portion, said paper discharge portion and said printing portion being supported on said frame above said planar surface; said paper storage portion and said paper discharge portion being oriented obliquely at substantially the same angle of inclination relative to said planar surface; and said paper storage portion, said paper discharge portion and said printing portion respectively having first, second and third geometric projection regions in a plane parallel to said planar surface, at least one of the first, second and third projection regions being contained in at least one of the remaining two of the first, second and third projected regions.

* * * * *